US006932548B2

(12) United States Patent
Obrachta

(10) Patent No.: US 6,932,548 B2
(45) Date of Patent: Aug. 23, 2005

(54) SURFACE COMPENSATING SHAVING APPARATUS

(75) Inventor: Kevin L. Obrachta, Wichita, KS (US)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 10/376,438

(22) Filed: Feb. 28, 2003

(65) Prior Publication Data

US 2004/0170483 A1 Sep. 2, 2004

(51) Int. Cl.$^7$ .............................................. B23B 31/08
(52) U.S. Cl. ...................... 409/234; 409/139; 409/140; 409/131; 279/16
(58) Field of Search ............................. 409/234, 139, 409/140, 131, 132, 297, 298, 300, 301; 279/97, 16; 29/426.4

(56) References Cited

U.S. PATENT DOCUMENTS

| | | | | |
|---|---|---|---|---|
| 3,967,830 A | * | 7/1976 | Smith ........................... | 279/16 |
| 4,104,943 A | * | 8/1978 | Calderoni .................... | 409/191 |
| 4,269,421 A | * | 5/1981 | Wawrzyniak ................. | 279/16 |
| 4,396,317 A | * | 8/1983 | Staron et al. ................. | 279/20 |
| 4,514,115 A | * | 4/1985 | Akashi .......................... | 279/16 |
| 4,668,017 A | | 5/1987 | Peterson et al. | |
| 4,733,995 A | * | 3/1988 | Aebi ............................ | 407/34 |
| 4,758,050 A | | 7/1988 | Peterson et al. | |
| 4,776,734 A | * | 10/1988 | Buettiker et al. ........... | 409/234 |
| 5,090,851 A | * | 2/1992 | White ......................... | 409/199 |
| 5,736,222 A | * | 4/1998 | Childress .................... | 428/119 |
| 5,909,882 A | * | 6/1999 | Schill ......................... | 409/234 |
| 5,967,706 A | * | 10/1999 | Hughes, Jr. .................. | 407/53 |
| 6,179,943 B1 | * | 1/2001 | Welch et al. ............... | 156/160 |
| 6,190,602 B1 | * | 2/2001 | Blaney et al. .............. | 264/443 |
| 6,311,987 B1 | * | 11/2001 | Rinne et al. ................ | 409/234 |
| 6,491,482 B1 | * | 12/2002 | Fenkl et al. ................ | 409/132 |
| 6,612,791 B1 | * | 9/2003 | Haimer ....................... | 409/234 |
| 6,634,651 B2 | * | 10/2003 | Tralli .......................... | 279/16 |

* cited by examiner

*Primary Examiner*—A. L. Wellington
*Assistant Examiner*—Dana Ross

(57) ABSTRACT

A surface compensating shaving apparatus (24) has been provided for removing a plurality of pins (12) from a surface of a pinmat (14). The apparatus (24) includes a rotary member (28) and a surface compensating member (32) that is fixedly coupled to the rotary member (28) in a rotational direction and slidably coupled to the rotary member (28) in an axial direction. The surface compensating member (32) has a plurality of cutting members (34) extending therefrom for cutting the pins (12). The surface compensating member (32) and the cutting members (34) are intended to move in the axial direction in response to the contour of the surface (26) of the pinmat (14). In this regard, the cutting members (34) can shear the pins (12) at the surface (26) of the pinmat (14).

9 Claims, 8 Drawing Sheets

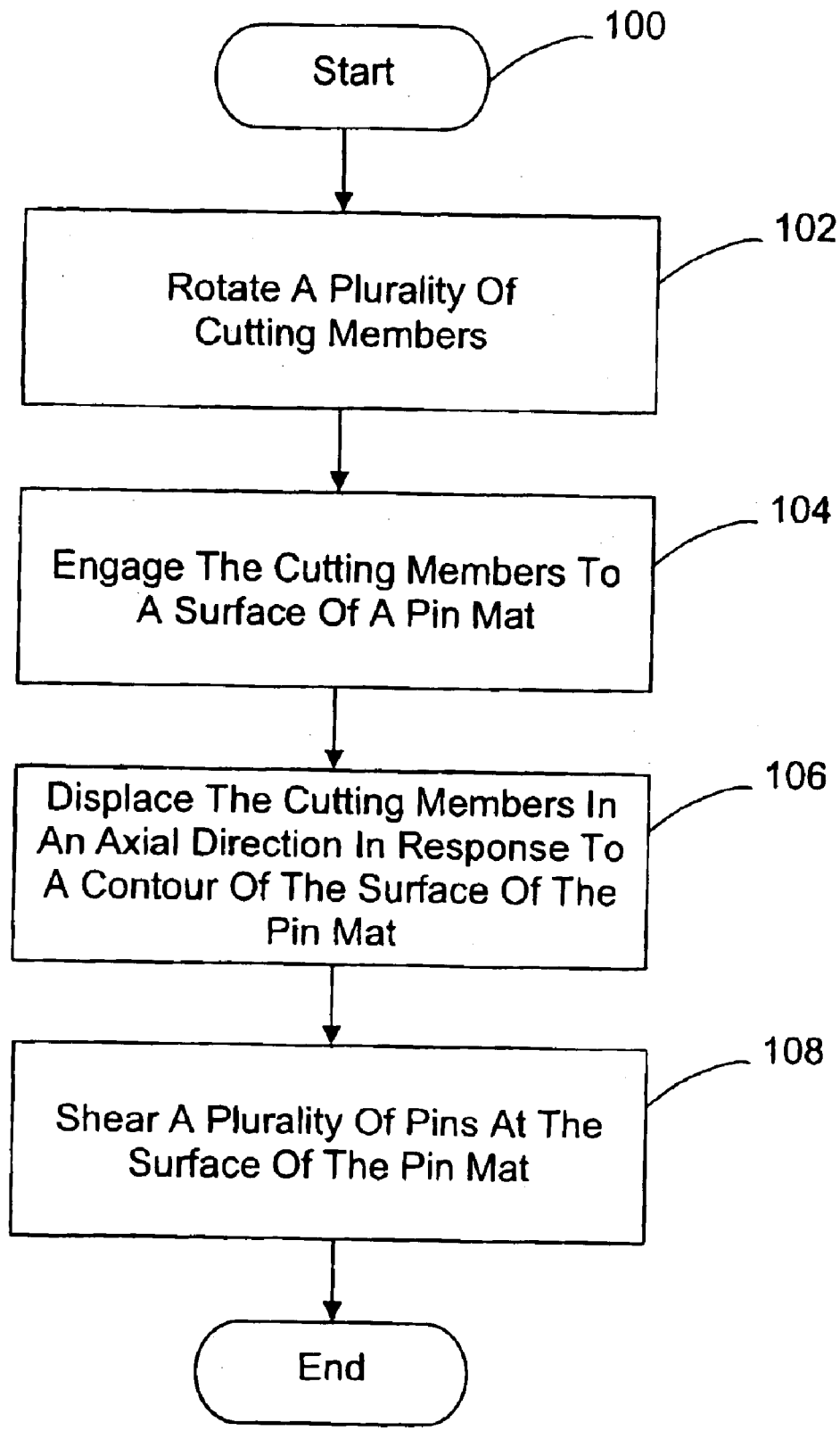

SURFACE COMPENSATING SHAVING APPARATUS

TECHNICAL FIELD

The present invention relates generally to pinmats having pins for perforating composite laminates, and more particularly to shaving mechanisms for removing the pins from the pinmats.

BACKGROUND OF THE INVENTION

Nacelles are well known in the aviation industry as streamlined enclosures for aircraft engines. Each enclosure ordinarily includes one or more perforated face sheets which are intended to absorb engine noise and provide structural support for the engine. Moreover, the perforated face sheets can be comprised of composite laminates. These composite laminates are beneficial because they are substantially light in weight, resistant to fatigue in sonic environments, and have favorable life cycle costs.

The perforation of the sheets typically requires that uncured laminate sheets are forced onto a pinmat. The typical pinmat is comprised of a series of pins integrally formed within a thick mat portion.

These pinmats ordinarily are formed by a multiple step process. This process normally begins with the injection molding of the pinmat utilizing a talc-filled polypropylene material. However, various other materials and manufacturing processes can be utilized as desired. Thereafter, a milling machine typically is utilized for trimming the edges of the pinmat and removing specific pins therefrom. The removal of specific pins allows the pinmat to leave predetermined portions of the face sheet unperforated as desired. The milling machine includes a milling head with a one-piece end mill chucked therein. The end mill normally is intended to operate at a specific predetermined height for the purpose of shearing specific pins at their bases at the surface of the pinmat.

However, the one-piece end mill typically cuts the pins either too high or too low because the predetermined height does not account for the variations in the thickness of the mat portion, as well as for the imperfections in the flatness of the machine bed. Specifically, variations in the thickness of the mat portion can be up to 0.010 inches or higher. Additionally, the imperfections in the flatness of the machine bed can create height fluctuations up to 0.002 inches, as well. These variations and imperfections typically prevent the milling machine from shearing the pins off at the surface of the mat. For example, if the milling machine is operated at a height below the surface of the pinmat, the end mill can create nubs, pits, or grooves within the surface and deposit friction melted debris thereon. On the other hand, if the milling machine is operated at a height above the surface, the end mill can produce pin nubs extending from the surface of the pinmat. Typically, either result requires an operator to smooth and repair the surface using a hand-held scraper or an orbital sander.

A drawback of the nubs and pits created by existing shaving mechanisms is that the smoothing operation for repairing the pinmat usually requires a substantial amount of time thereby increasing the overall manufacturing cycle time and the costs associated therewith.

Another drawback of the nubs and pits created by existing shaving mechanisms is that the hand finishing operation can result in fatigue and repetitive-motion injuries, i.e. carpel tunnel syndrome, to the operators.

Therefore, a need exists for a shaving mechanism that removes pins from a pinmat without leaving a nub, a pit, or a groove within the surface of the pinmat.

SUMMARY OF THE INVENTION

The present invention provides a surface compensating shaving apparatus for removing one or more pins from a surface of a pinmat. The apparatus includes a rotary member and a surface compensating member. The surface compensating member is fixedly coupled to the rotary member in a rotational direction and slidably coupled to the rotary member in an axial direction. The surface compensating member includes one or more cutting members extending therefrom for cutting the pins. The surface compensating member and the cutting members are intended to move in the axial direction in response to the contour of the surface of the pinmat. In this regard, the cutting members can shear the pins at the surface of the pinmat.

One advantage of the invention is that a surface compensating shaving apparatus is provided that automatically adjusts to the surface of a pinmat so as to shear the pins at the surface of the pinmat.

Another advantage of the invention is that a surface compensating shaving apparatus is provided that eliminates the need for additional manufacturing processes which can increase overall manufacturing cycle time and costs associated therewith.

Still yet another advantage of the present invention is that a surface compensating shaving mechanism is provided that eliminates the need for hand finishing operations, i.e. scraping or orbital sanding, thereby decreasing the risk of repetitive motion injuries, i.e. carpel tunnel syndrome.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention:

FIG. 9 is logic flow diagram for a method of operating a shaving device for removing pins from a surface of a pinmat, in accordance with one embodiment of the present invention.

DETAILED DESCRIPTION OF THE INVENTION

Figure 1:
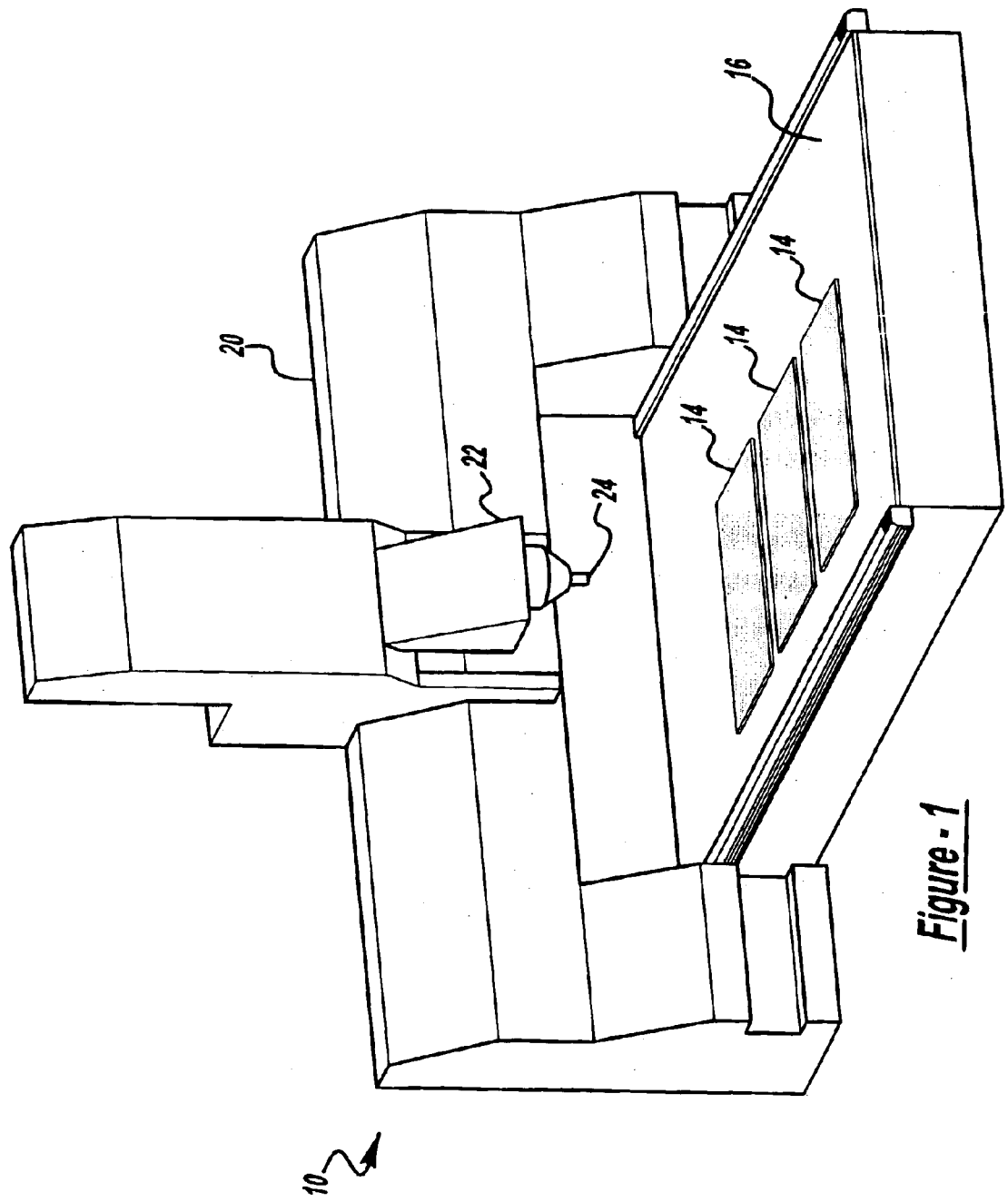
FIG. 1 is a perspective view of a three-axis milling machine utilized for actuating a surface compensating shaving apparatus for the purpose of removing one or more pins from a pinmat, in accordance with one embodiment of the present invention.

In the following figures the same reference numerals will be used to illustrate the same components in the various views. The present invention is particularly suited for removing pins from the surface of a pinmat. However, it is understood that the present invention may be utilized within a variety of other environments as desired.

Figure 8:
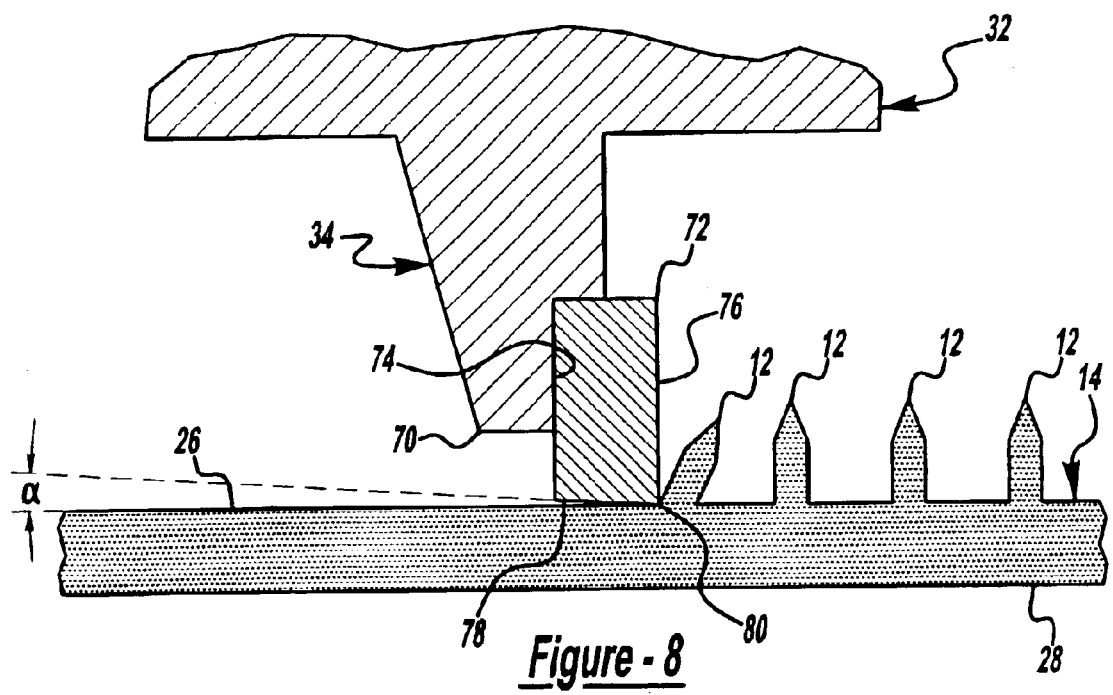
FIG. 8 is a cross-sectional view illustrating a cutting member removing pins from a surface of a pinmat, in accordance with one embodiment of the present invention.

Referring to FIG. 1, there is shown a perspective view of a three-axis milling machine 10 utilized for removing pins 12 (as shown in FIG. 8) from one or more pinmats 14, according to one embodiment of the present invention. The pinmats 14 are secured to a bed surface 16 of the milling machine 10. Each pinmat 14 is comprised of a mat portion 18 and a series of pins 12 extending from the mat portion 18 (as shown in FIG. 8).

The milling machine 10 includes a gantry 20 with a milling head 22 mounted thereon and a surface compensating shaving apparatus 24 (referred to hereinafter as "shaving apparatus") chucked in the milling head 22. The milling head 22 is intended to rotate the shaving apparatus 24 for the purpose of removing selected pins 12 from specific areas of the pinmats 14. Furthermore, the gantry 20 can maneuver the milling head 22 along the three axes so as to allow the shaving apparatus 24 to remove pins 12 from any area on the pinmats 14.

Figure 2:
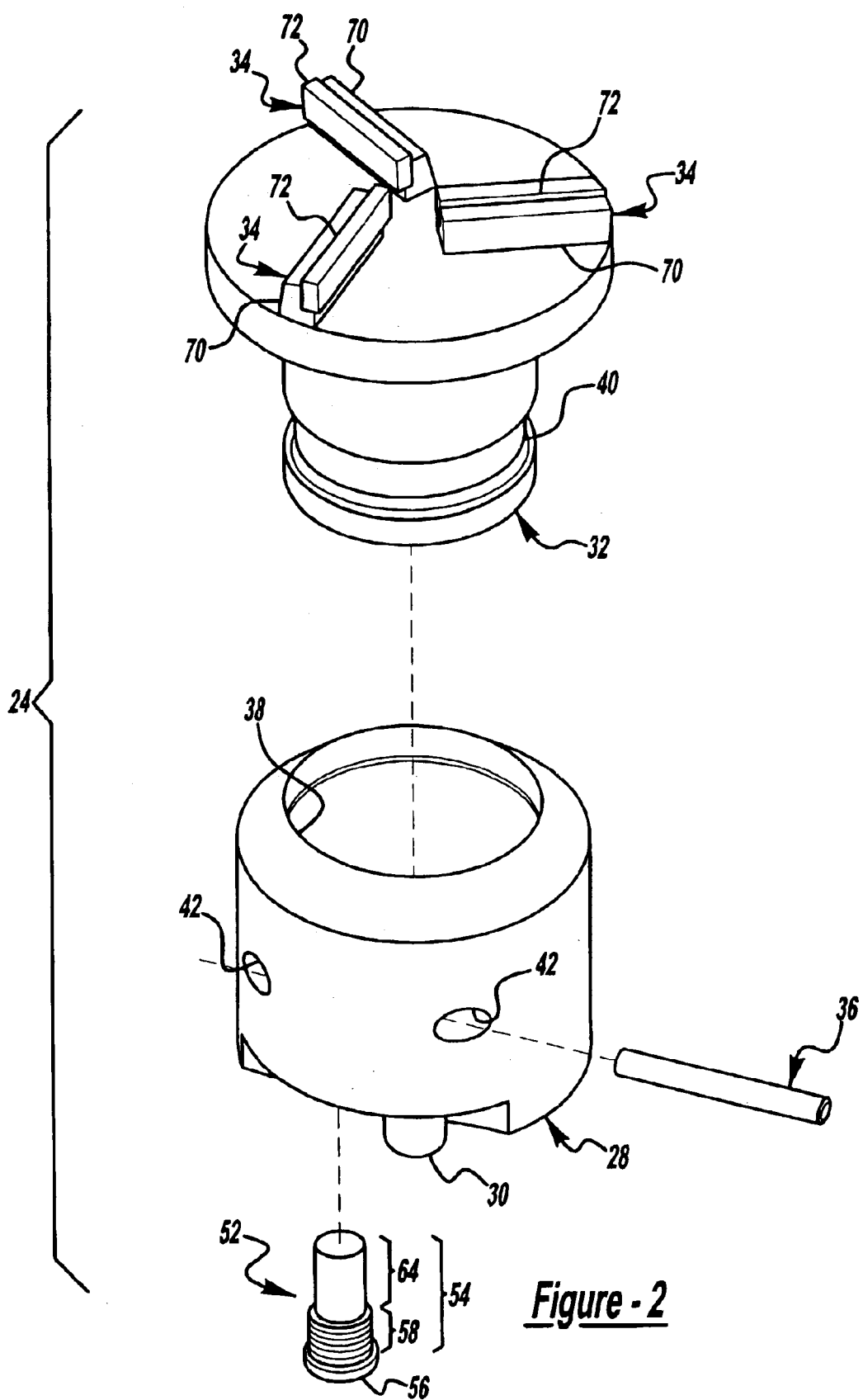
FIG. 2 is an exploded view of a surface compensating shaving apparatus utilized for removing one or more pins from a pinmat, in accordance with one embodiment of the present invention.
Figure 3:
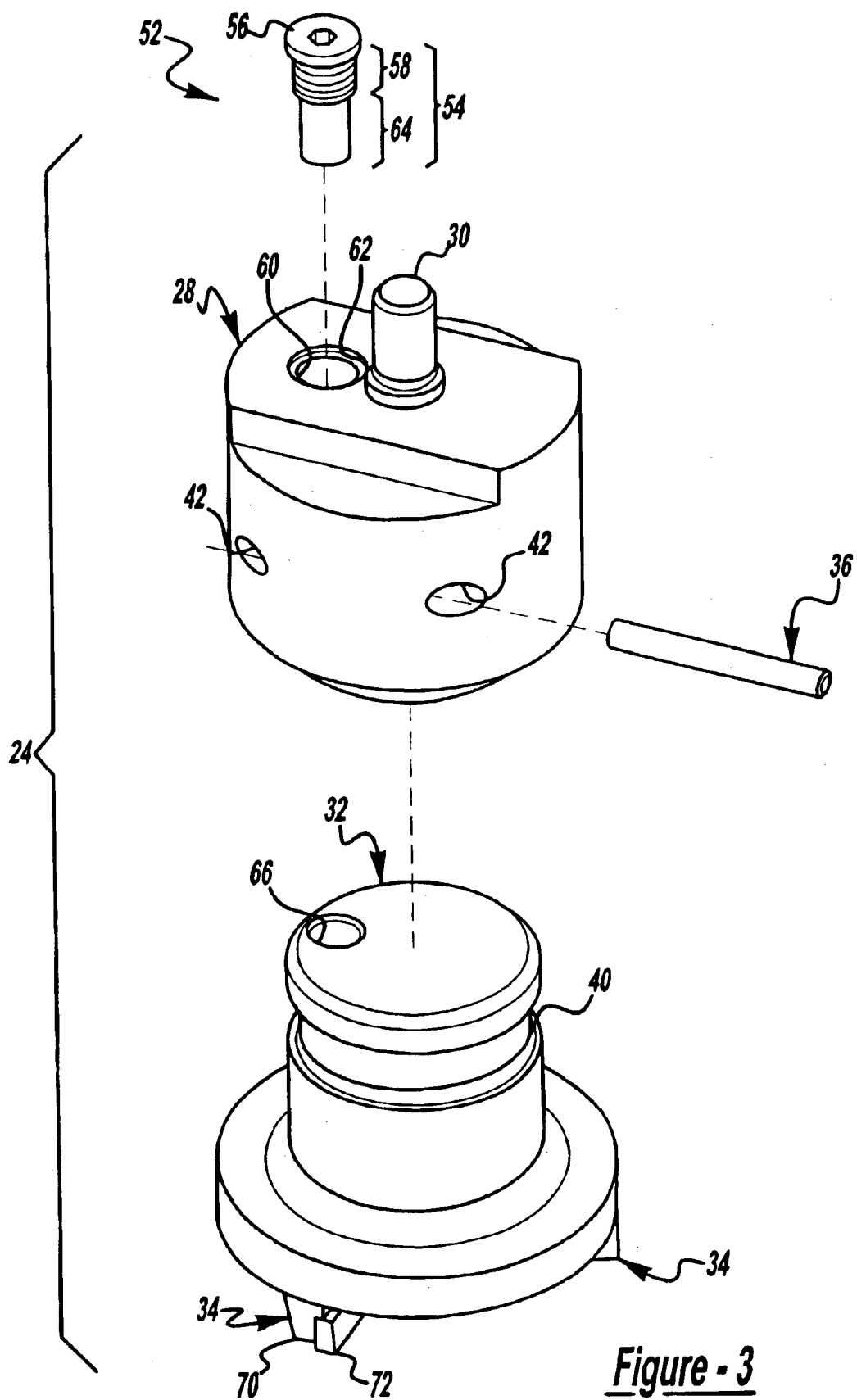
FIG. 3 is an inverted view of the surface compensating shaving apparatus shown in FIG. 2.
Figure 4:
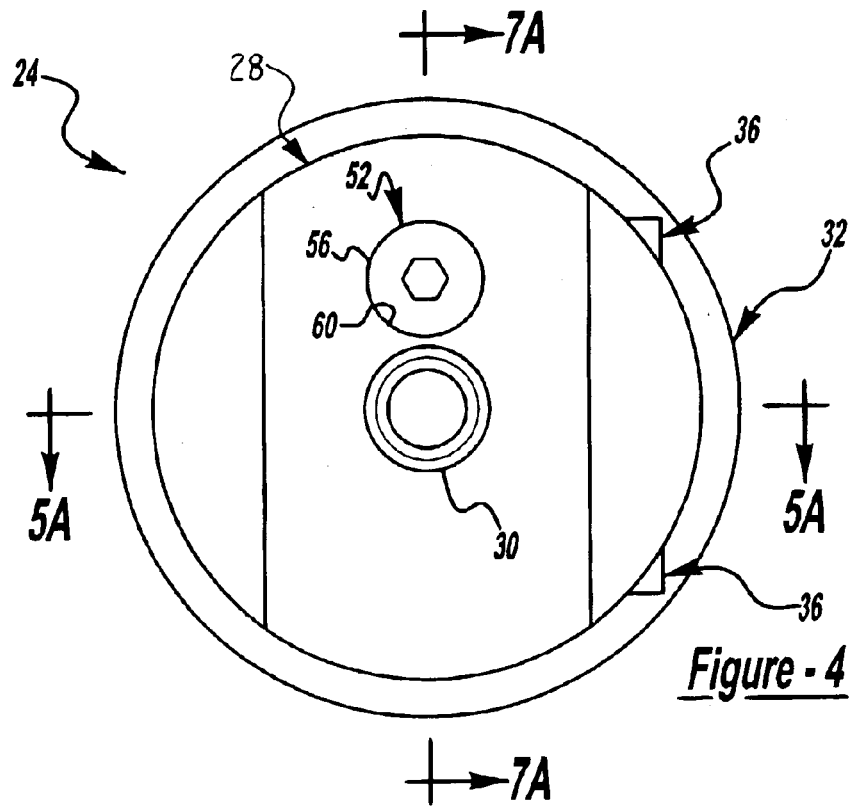
FIG. 4 is a top view of a surface compensating shaving apparatus, in accordance with one embodiment of the present invention.

Referring now to FIGS. 2 and 3, there is shown a shaving apparatus 24 according to one embodiment of the present invention. This shaving apparatus 24 is constructed for shearing the pins 12 from the pinmat 14 cleanly at the surface 26 of the pinmat 14.

The shaving apparatus 24 includes a rotary member 28 with a stubshaft 30 extending therefrom for chucking the shaving apparatus 24 into the milling head 22 of the milling machine 10. This stubshaft 30 is intended to receive torque from the milling head 22 for the purpose of operating the shaving apparatus 24. However, it is understood that the rotary member 28 may include various other structures that permit a variety of other power sources to utilize different motions for actuating the shaving apparatus 24. For example, the shaving apparatus 24 may instead be mounted in a different machine with a different type of chuck.

In general, this rotary member 28 is coupled to a surface compensating member 32 that has one or more cutting members 34 (as described in further detail in the explanation for FIG. 8) extending from the surface compensating member 32. The rotary member 28 is slidably coupled to the surface compensating member 32 in an axial direction and fixedly coupled thereto in a rotational direction. In this regard, the rotary member 28 can rotate the surface compensating member 32 at a desired speed yet allow the surface compensating member 32 to translate back and forth in an axial direction perpendicular to the surface 26 of the pinmat 14.

Figure 5A:
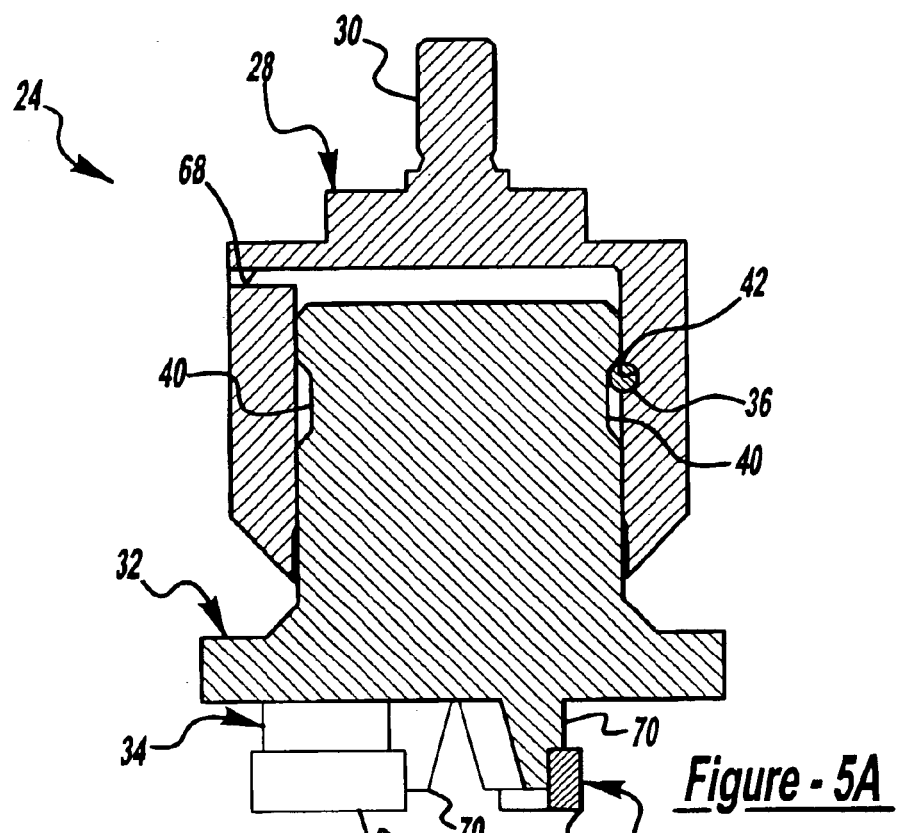
FIG. 5A is a cross-sectional view of the surface compensating shaving apparatus shown in FIG. 4, as taken along line 5A—5A, in a fully extended position.
Figure 5B:
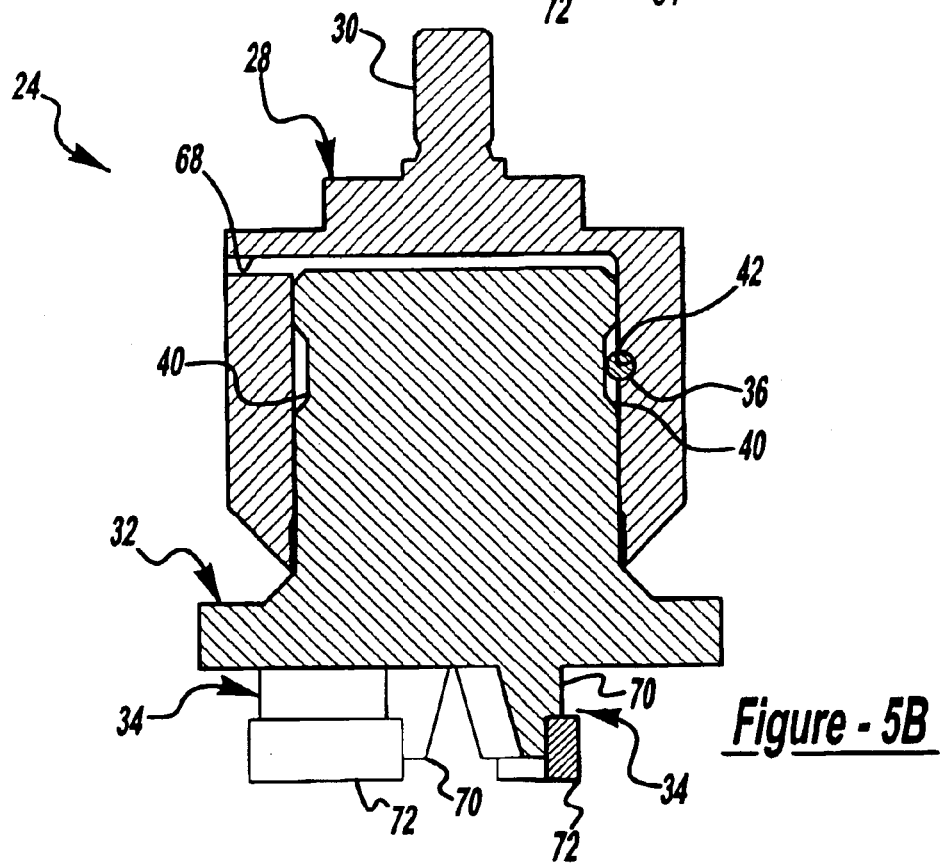
FIG. 5B is a cross-sectional view of the surface compensating shaving apparatus shown in FIG. 5A, in a fully retracted position.

More specifically, the shaving apparatus 24 includes a retaining rod 36 that is positioned between the rotary member 28 and the surface compensating member 32 so as to allow the surface compensating member 32 to oscillate in the axial direction. The rotary member 28 has a cup construction with an opening 38 for receiving the surface compensating member 32. This surface compensating member 32 has an annular groove 40 that is intended to be aligned with a channel 42 partially formed within the rotary member 28. The retaining rod 36 is inserted into the channel 42 and sandwiched between the surface compensating member 32 and the rotary member 28. This annular groove 40 is sized sufficiently large for allowing the surface compensating member 32 to position the retaining rod 36 therein and allow the surface compensating member 32 to slide between a fully extended position (as shown in FIG. 5A) and a fully retracted position (as shown in FIG. 5B). This retaining rod 36 is intended to prevent the surface compensating member 32 from being completely extracted from the rotary member 28. Also, the retaining rod 36 can allow for relatively simple disassembly of the shaving apparatus 24 for the purpose of servicing the shaving apparatus 24, e.g. sharpening the cutting members 34. According to an alternative embodiment of the invention, it is understood that the surface compensating member may have a cup construction with an opening formed therein for receiving the rotary member.

The surface compensating member 32 is biased toward the pinmat 14 with sufficient force so as to cause the cutting members 34 to shear the pins 12 cleanly at the surface 26 of the pinmat 14 without producing pin nubs that can require a separate manual finishing procedure. On the other hand, the biasing force is sufficiently small that the cutting members 34 do not shave below the surface 26 and create pits or grooves that can also require another separate manual finishing procedure or, even worse, destroy the pinmat 14 altogether. This biasing force is approximately 2–5 pounds but may be otherwise as desired.

In one embodiment, as best shown in FIGS. 5A and 5B, a substantially downward biasing force is provided by a surface compensating member 32 that is comprised of a heavy material, i.e. lead. However, it is understood that a variety of other suitable materials may provide for a sufficient downward biasing force. Additionally, the rotary member 28 includes an air relief port 68 that provides for open communication between an exterior and an interior of the shaving apparatus 24. In this regard, air may freely enter and exit the shaving apparatus 24 thereby facilitating the movement of the surface compensating member 32 between a fully extended position and a fully retracted position. This embodiment is particularly beneficial when the shaving apparatus 24 is operated in an upright position with the rotary member 28 positioned directly above the surface compensating member 32 and the pinmat 14.

Figure 6A:
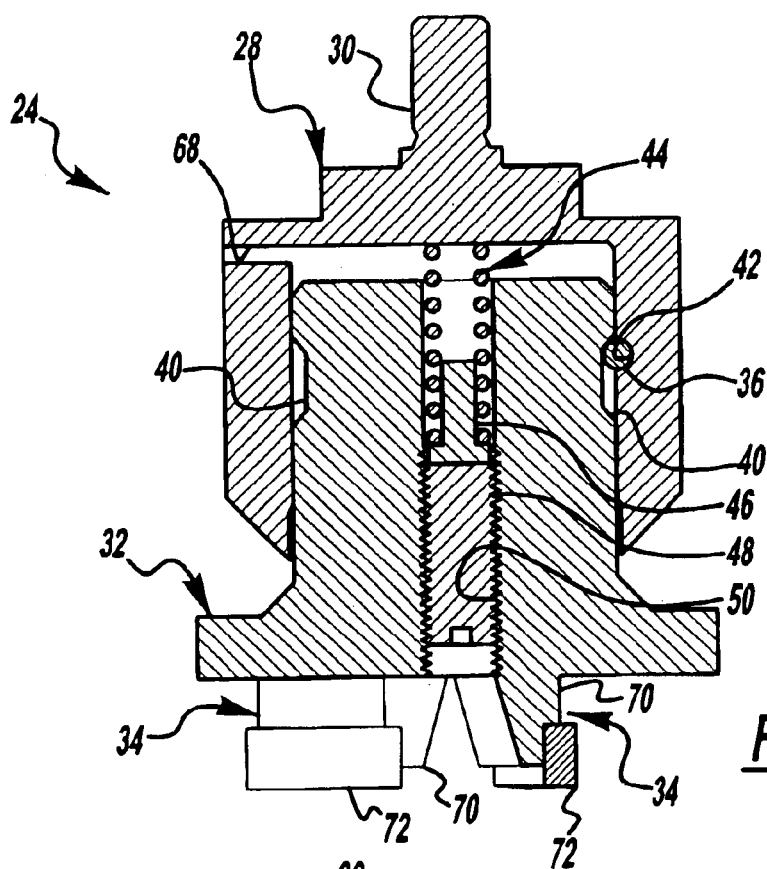
FIG. 6A is a cross-sectional view of a surface compensating shaving apparatus in a fully extended position, in accordance with another embodiment of the present invention.
Figure 6B:
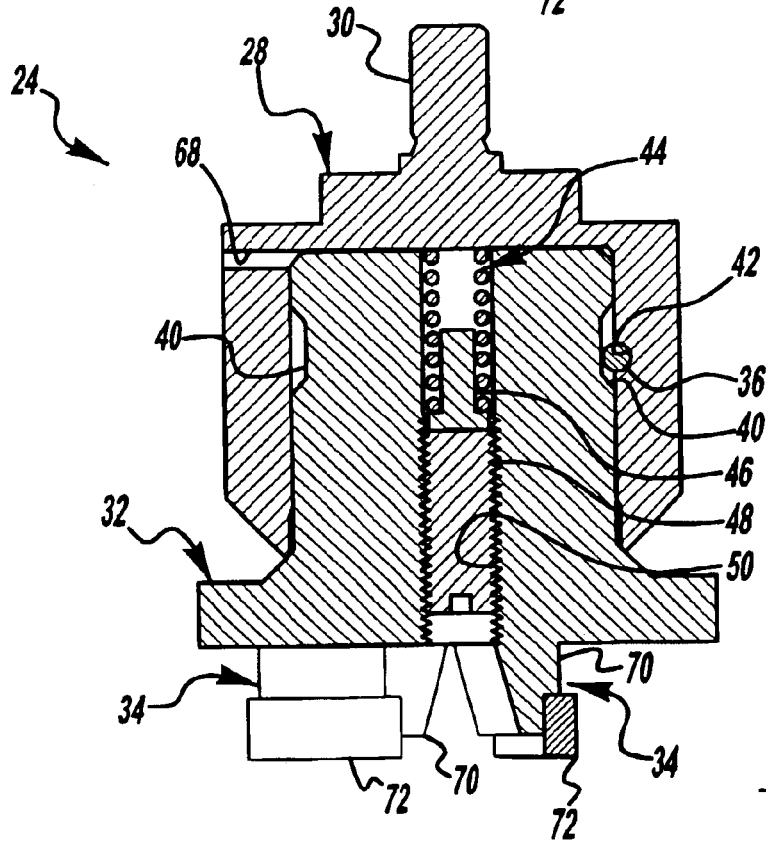
FIG. 6B is a cross-sectional view of the surface compensating shaving apparatus shown in FIG. 6A in a fully retracted position.

In another embodiment, as exemplified in FIGS. 6A and 6B, the shaving apparatus 24 includes a biasing member 44 for forcing the cutting members 34 onto the pinmat 14 regardless of the orientation of the shaving apparatus 24. In this regard, the biasing member 44 is operatively positioned between the rotary member 28 and the surface compensating member 32.

For example, the surface compensating member 32 can include an internally threaded center bore 50. This center bore 50 can be intended to receive the biasing member 44, i.e. a spring. This biasing member 44 may have an end cap 46 coupled thereto for allowing the biasing member 44 to engage an externally threaded detent screw 48. This detent screw 48 is fastened to the surface compensating member 32 within the center bore 50 for the purpose of retaining the biasing member 44 within the shaving apparatus 24 and permitting the biasing member 44 to force the surface compensating member 32 away from the rotary member 28 and toward the pinmat 14.

Additionally, a desired amount of the biasing force can be supplied by a utilizing a spring or other biasing member that has a specific spring constant. As one skilled in the art will understand, a spring having a larger spring constant can provide a larger biasing force. In contrast, a spring having a smaller spring constant can provide a smaller biasing force.

Furthermore, the biasing force can also be increased or decreased by adjusting the position of the detent screw 48. In particular, positioning the detent screw 48 deeper within the bore 50 and closer to the rotary member 28 compresses the spring thereby loading the spring and increasing the biasing force that the spring applies to the surface compensating member 32. On the other hand, positioning the detent screw 48 farther away from the rotary member 28 decompresses the spring so as to decrease the biasing force it applies to the surface compensating member 32.

Although only two examples of constructions that apply biasing forces are described, it is understood that a variety of other suitable constructions can be utilized for imparting sufficient force on the surface compensating member 32 and causing the cutting members 34 to shear the pins 12 cleanly at the surface 26 of the pinmat 14. For example, other embodiments of the invention can impart sufficient force via gas pressure, multiple springs, Bellville washers, or a centripetal force actuated mechanism. It is also understood that in a different configuration, the biasing force could be applied to the individual cutting members instead of an entire surface compensating member.

Figure 7A:
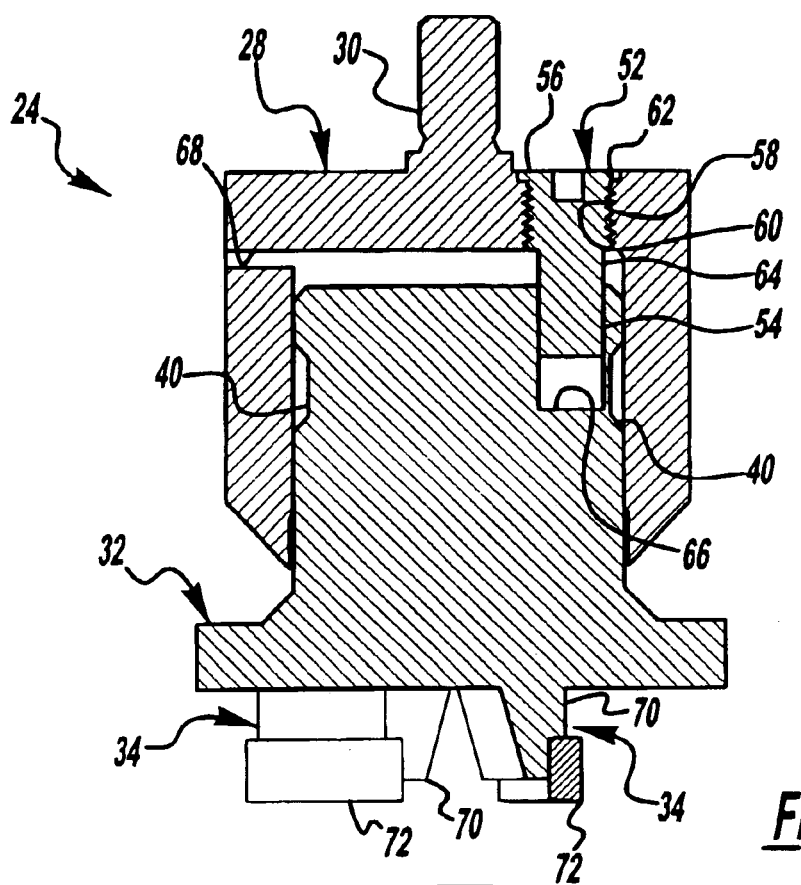
FIG. 7A is a cross-sectional view of the surface compensating shaving apparatus shown in FIG. 4, as taken along line 7A—7A, in a fully extended position.
Figure 7B:
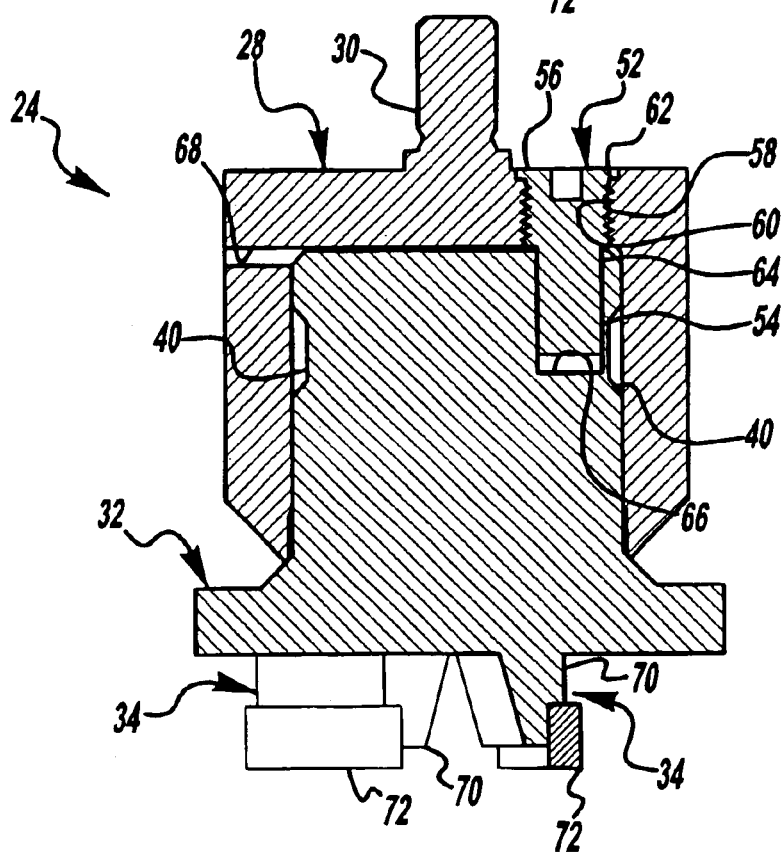
FIG. 7B is a cross-sectional view of the surface compensating shaving apparatus shown in FIG. 7A, in a fully retracted position.

Referring now to FIGS. 7A and 7B, the shaving apparatus 24 includes a torque transfer member 52 for fixedly coupling the rotary member 28 to the surface compensating member 32 in a rotational direction, in accordance with one embodiment of the present invention. This torque transfer member 52 is intended to transfer torque while the shaving apparatus is disposed in a fully extended position (as shown in FIG. 7A), a fully retracted position (as shown in FIG. 7B), and any other position therebetween.

In one embodiment as exemplified in FIGS. 7A and 7B, the torque transfer member 52 has a bolt construction with a shaft portion 54 and a head flange 56 extending from the shaft portion 54. The shaft portion 54 has an upper segment 58 with external threading integrally formed thereon. This upper segment 58 is intended to be inserted into an internally threaded hole 60 formed within the rotary member 28 so as to fasten the torque transfer member 52 to the rotary member 28. Moreover, the head flange 56 is intended to be seated within a countersink 62 formed within the rotary member 28 for the purpose of locating the torque transfer member 52 at a predetermined depth within the shaving apparatus 24 and maintaining a smooth surface across the exterior of the rotary member 28.

The shaft portion 54 of the torque transfer member 52 also includes a lower segment 64 that is intended to be inserted within a recess 66 formed in the surface compensating member 32. This lower segment 64 transfers torque to the surface compensating member 32 thereby causing the surface compensating member 32 to rotate with the rotary member 28. Furthermore, the lower segment 64 of the torque transfer member 52 can slide within the recess 66 as it applies torque to the surface compensating member 32. This coupling allows the rotary member 28 to rotate the surface compensating member 32 when the shaving apparatus 24 is disposed in a fully retracted position (as shown in FIG. 7A), a fully extended position (as shown in FIG. 7B), and any other position therebetween. It should also be understood that there are a variety of other mechanisms, e.g. splined shafts and keys, that can transmit torque from rotary member 28 to the surface compensating member 32. In addition, the shaving apparatus 24 may not even include a torque transfer member but instead have an engagement between opposing splined surfaces of the surface compensating member 32 and the rotary member 28.

Referring now to FIG. 8, there is shown a cross-sectional view of a cutting member 34 according to one embodiment of the present invention. Each cutting member 34 is a two-piece construction including a lug 70 and a cutting insert 72 coupled to the lug 70. Specifically, the lug 70 is an integral part of the surface compensating member 32 and extends from the surface compensating member 32. However, it is also understood that the lug 70 can be a separate component that is attached to the surface compensating member 32 as desired. In addition, it is understood that the cutting member 34 can be comprised of more or less than two components as desired.

Each lug 70 includes an indentation 74 that is intended to receive the cutting insert 72 therein. This cutting insert 72 is intended to contact the pinmat 14 and shear the pins 12 off the pinmat 14. Preferably, the insert 72 is a wear-resistant tungsten carbide material that is soldered onto the lug 70 within the indentation 74 of the lug 70. Alternatively, the insert 72 can be comprised of a diamond material or various other suitable materials that are fastened to the lug 70 by other suitable fastening methods.

Each insert 72 includes a front surface 76 and a cutting land surface 78 adjoined together by a cutting edge 80. This cutting land surface 78 is positioned at a predetermined angle, e.g. 3.5 degrees, relative to the pinmat 14 for the purpose of preventing the cutting land surface 78 from sliding along the surface 26 of the pinmat 14. It is beneficial to prevent the cutting land surface 78 from contacting the surface 26 of the pinmat 14 because the cutting land surface 78 may otherwise damage the surface 26 of the pinmat 14 and increase torque requirements from the rotary member 28.

Although three cutting members 34 are illustrated in the figures, it is understood that the surface compensating member 32 can have more or less than three cutting members 34 extending therefrom. In addition, despite the illustration of linear cutting edges 80, other embodiments can include non-linear or curved edges as desired.

A person skilled in the art would understand that the construction of the surface compensating member 32 is advantageous because it can be easily chucked or mounted into a tool for securing the cutting members 34 in a desired position and allowing the cutting edges 80 to be sharpened.

Each of the components of the shaving apparatus 24 is heat-treated in order to improve resistance to wear typically experienced during operation. However, it is also understood that these components may not be heat-treated as desired, or could even be fabricated from nonmetallic materials.

Referring now to FIG. 9, there is shown a logic flow diagram for a method of operating a shaving apparatus 24 for removing pins 12 from a surface 26 of a pinmat 14, in accordance with one embodiment of the present invention. The sequence commences at step 100 and immediately proceeds to step 102.

In step 102, the cutting members 34 are moved in a rotational direction for cutting the pins 12 extending from the pinmat 14. As described above, this step is accomplished by initially mounting the shaving apparatus 24 to a milling machine 10. Specifically, the stubshaft 30 of the rotary member 28 is secured within the chuck of the milling head 22. Thereafter, the milling machine 10 is activated so as to rotate the rotary member 28. Likewise, this rotary member 28 rotates the surface compensating member 32 that is fixedly coupled to the rotary member 28 in a rotational direction. This surface compensating member 32 includes the cutting members 34 and therefore causes the cutting members 34 to rotate as well.

Alternatively, it is understood that this step may be accomplished by various other structures that permit a variety of other power sources to utilize different motions for actuating the shaving apparatus 24. For example, the shaving apparatus 24 may instead include a mounting member for attachment to a robotic arm. Then, the sequence proceeds to step 104.

In step 104, the cutting members 34 are engaged to the surface 26 of the pinmat 14. In continuation of the example described in step 102, this step may be accomplished by executing a software program that commands the milling head 22 to lower the shaving apparatus 24 to the pinmat 14. However, it is understood that this step may be accomplished by a variety of other suitable actions. For example, a hand-held shaving apparatus 24 may be manually applied to the surface 26 of the pinmat 14. After engaging the cutting members 34 to surface 26 of the pinmat 14, the sequence then proceeds to step 106.

In step 106, the cutting members 34 are automatically displaced in an axial direction in response to the contour of the surface 26 of the pinmat 14. This step may include biasing the cutting members 34 toward the surface 26 of the pinmat 14. For example, a biasing member 44, i.e. spring, may be operatively coupled between the rotary member 28 and the surface compensating member 32 in order to bias the cutting members 34 toward the pinmat 14. In this respect, the cutting members 34 are continuously positioned at a level equal to the surface 26 of the pinmat 14 for the purpose of allowing the cutting members 34 to shear the pins 12 cleanly at this surface 26. As a result, the cutting members 34 are prevented from cutting the pins 12 either too high or too low and causing nubs, pits, or grooves to be formed on the mat surface 26. Then, the sequence then proceeds to step 108.

In step 108, the cutting members 34 shear the pins 12 at the surface 26 of the pinmat 14. The cutting members 34 may utilize a cutting edge 80 to shear the pins 12. This cutting edge 80 is adjacent to a cutting land surface 78 which is positioned at a predetermined angle for preventing the cutting land surface 78 from dragging on the surface 26 of the pinmat 14. As a result, less friction exists between the shaving apparatus 24 and the pinmat 14 thereby decreasing the power requirements for operating the shaving apparatus 24, the wear experienced by the shaving apparatus 24, and the risk of damage to the pinmat 14.

While particular embodiments of the invention have been shown described, numerous variations and alternate embodiments will occur to e skilled in the art. Accordingly, it is intended that the invention be limited in terms of the appended claims.

What is claimed is:

1. A surface compensating shaving apparatus for removing a plurality of pins from a surface of a pinmat, comprising:
   a rotary member having a first recess integrally formed therein;
   a surface compensating member being fixedly coupled to said rotary member in a rotational direction and slidably coupled to said rotary member in an axial direction, said surface compensating member having a second recess integrally formed therein;
   at least one cutting member extending from said surface compensating member for shearing the plurality of pins at the surface of the pinmat; and
   a biasing member disposed within at least one of said first recess in said rotary member and said second recess in said surface compensating member, said biasing member for biasing said at least one cutting member toward the surface of the pinmat;
   an end cap for coupling to an end of said biasing member; and
   a screw member for contacting said end cap and forcing said end cap in an axial direction so as to compress said biasing member at a desired compression, said screw for coupling to said surface compensating member within said second recess and forcing said end cap in an axial direction.

2. The surface compensating shaving apparatus of claim 1 wherein each of said at least one cutting member has a front surface and a cutting land surface, said front surface and said cutting land surface being adjoined by a cutting edge, said cutting land surface being offset at a desired angle from a rotational plane of said at least one cutting member so as to prevent said cutting land surface from contacting the surface of the pinmat.

3. The surface compensating shaving apparatus of claim 1 wherein said rotary member is a cup member for slidably receiving said surface compensating member therein.

4. The surface compensating shaving apparatus of claim 3 further comprising:
   a retaining rod for slidably coupling said cup member to said surface compensating member, said retaining rod intended to be placed within a channel integrally formed within said cup member and an annular groove integrally formed within said surface compensating member.

5. The surface compensating shaving apparatus of claim 4 wherein said cup member defines an air relief port for permitting open communication of air between an exterior of said cup member and an interior of said cup member, said air relief port for facilitating said surface compensating member in moving in said axial direction.

6. A method for removing a plurality of pins from a surface of a pinmat comprising:
   moving a plurality of cutting members in an operational motion;
   engaging said plurality of cutting members to the surface of the pinmat;
   displacing said plurality of cutting members in an axial direction substantially perpendicular to the surface of the pinmat and in response to a contour of the surface of the pinmat; and
   shearing the plurality of pins at the surface of the pinmat;
   wherein moving said plurality of cutting members comprises rotating a surface compensating member fixedly coupled to said plurality of cutting members.

7. The method of claim 6 wherein rotating said surface compensating member comprises:
   rotating a rotary member fixedly coupled to said surface compensating member in said rotational direction.

8. The method of claim 7 wherein displacing said plurality of cutting members in said plurality of cutters in said axial direction comprises:
   displacing said surface compensating member in said axial direction.

9. The method of claim 8 further comprising:
   biasing said surface compensating member and the plurality of pins toward the surface of the pinmat.

* * * * *